W. H. WELCH.
SINGLE HITCH FOR ORCHARD AND VINEYARD HARNESS.
APPLICATION FILED MAR. 13, 1913.
1,075,885.
Patented Oct. 14, 1913.
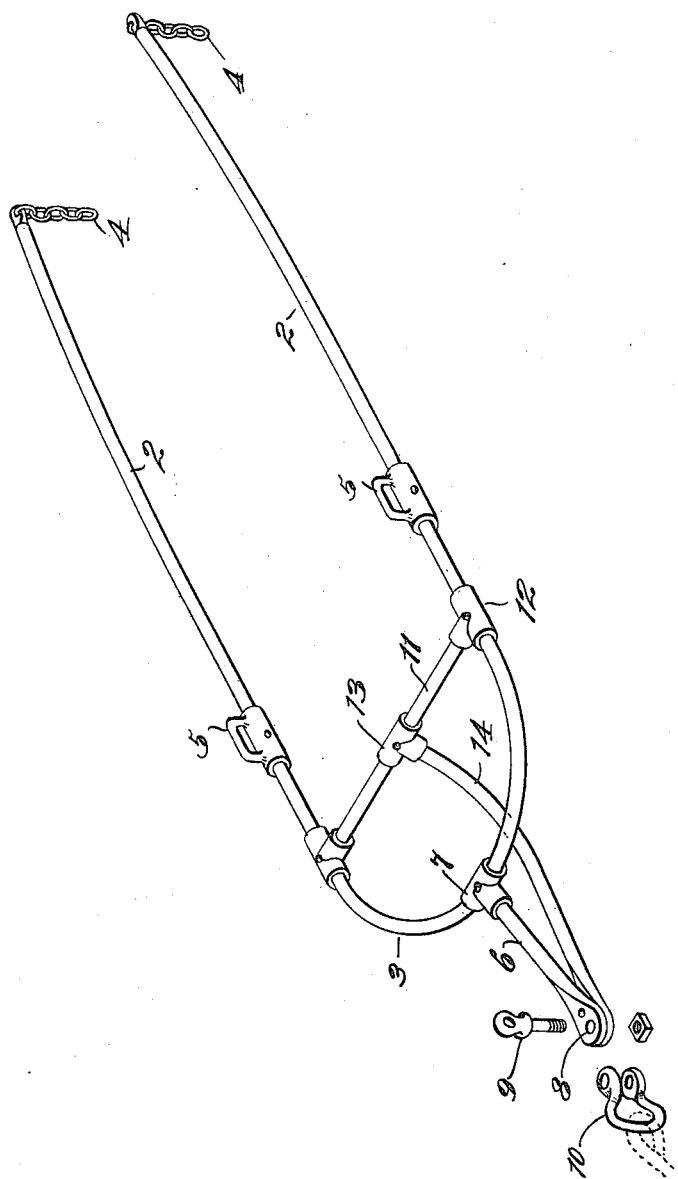
WITNESSES:
Charles Pickles
F. E. Maynard.
INVENTOR
William H. Welch,
BY G. H. Strong.
ATTORNEY

UNITED STATES PATENT OFFICE.

WILLIAM H. WELCH, OF BERKELEY, CALIFORNIA, ASSIGNOR OF ONE-HALF TO GEORGE ASH, OF WILLIAMS, CALIFORNIA.

SINGLE HITCH FOR ORCHARD AND VINEYARD HARNESS.

1,075,885.

Specification of Letters Patent. Patented Oct. 14, 1913.

Application filed March 13, 1913. Serial No. 753,937.

*To all whom it may concern:*

Be it known that I, WILLIAM H. WELCH, a citizen of the United States, residing at Berkeley, in the county of Alameda and State of California, have invented new and useful Improvements in Single Hitches for Orchard and Vineyard Harnesses, of which the following is a specification.

This invention relates to a single hitch shaft, and particularly to an improved reinforced tubular metallic hitch adaptable for use in connection with heavy farming or other implements.

One of the important objects of the present invention is to design and provide a hitch for connection to the harness of a draft animal or horse, which hitch will be particularly free from laterally projecting protuberances and overhanging or outwardly extending parts, such as tugs, swingletrees and other usual appurtenances, which in orchard and vineyard work do considerable damage by entanglement with the growing plants and trees.

It is also an object of this invention to provide a substantial, comparatively light hitch for heavy work which consists in rigidly reinforcing and connecting the shafts of the hitch to a swivel or clevis, to which may be connected the implement or part to be drawn.

The invention consists of the parts and the construction and combination of parts as hereinafter more fully described and claimed, having reference to the accompanying drawing, in which the figure is a perspective view of the improved hitch.

In its illustrated embodiment I have shown the new hitch as comprising forwardly extending shafts 2—2. These shafts extend rearwardly and unite in an integral loop or semicircular bend 3; the shafts and the bend 3 preferably being constructed of one piece. For the purpose of lightness and strength I prefer to employ tubular steel or other strong material, by the use of which I am enabled to keep the relative sizes and proportions of the constituent parts of the hitch within small dimensions.

The forward ends of the shafts 2 are provided with chains or other flexible coupling devices 4, attachable to the hames of the collar of the draft animal. Toward the rear ends of the shafts there is securely fastened on each a trace loop 5, to which may be secured the traces of the harness. Projecting rearwardly from approximately the center of the connecting bend or curve 3 of the hitch is an extension or bar 6, one end of which is secured in a T 7 which is riveted or otherwise securely fastened to the curved portion of the hitch; the rear end of the bar 6 being perforated, as at 8, for the reception of a bolt or pin 9 by which a clevis 10 may be pivotally secured to the hitch bar 6.

The strain of the draft on the hitch when in use is greatly removed from the rear curved portion 3 of the hitch by connecting the rear portions of the shafts 2, at the location where they approximately join the curved part 3, by a transverse tubular or other brace 11, the ends of which are fastened in connecting pieces or T's 12 secured on the shafts 2. From the central portion of the transverse brace or reinforce 11 on which is mounted a T 13 a downwardly curved and rearwardly extending draft bar 14 projects below the rear portion of the hitch and is alined with the perforated end of the short bar 6, the bolt 9 passing through the perforation in the draft bar 14, below the lower edge of which the clevis 10 will fit.

By this type of hitch I am enabled to dispense with swingletrees and other projecting appurtenances of ordinary hitches and at the same time obtain a very strong though comparatively light structure. By the use of the combined or double draft members 6 and 14, one, as 6, extending directly from the curve of the hitch and the other, as 14, extending from a transverse brace, each of the draft bars 6—14 tend to reinforce and brace each other and also protect the rear of the hitch against collapse under strain, since by connecting the lower draft bar 14 to the transverse brace the shafts 2 are rigidly spaced; the brace 11 being located approximately in the diameter of the rear curved portion 3 of the hitch, which latter forms an arch to which the T 7 is secured, and this is connected to the upper draft bar 6. This particular design of construction produces not only an extremely rigid draft hitch, but also one that is free from lateral or transverse projections which are so destructive to growing plants and trees when a vineyard or orchard is being worked.

Having thus described my invention, what I claim and desire to secure by Letters Patent is—

1. A hitch consisting of a pair of forwardly extending shafts connected by a curved rear portion, a brace extending transversely across the hitch at the position of the diameter of the curved rear end of the hitch, draft members connected respectively at their forward ends to the curved portion of the hitch and to said transverse brace, the rear ends of the draft members terminating evenly, and a clevis connected to the rear ends of the draft members.

2. A hitch comprising a pair of side shafts integrally connected at the rear by a curved part, devices on the shafts for connection to the harness of a draft animal, a transverse brace connecting the shafts adjacent to their intersection with the connecting curved part of the hitch, upper and lower draft members, the forward ends of which are respectively connected to the curved part of the hitch shaft and to said brace, and a clevis connected to the ends of said draft members.

3. A hitch consisting of a tubular piece bowed adjacent to its center to form an arc from which project forwardly in the plane of the arc side shafts, harness coupling devices secured on the side shafts, a brace extending transversely from the inner edges of the side shafts, a reinforced draft device with lower and upper reaches secured respectively to said transverse brace and the bow of the hitch, and a clevis secured to said draft device.

In testimony whereof I have hereunto set my hand in the presence of two subscribing witnesses.

WILLIAM H. WELCH.

Witnesses:
H. A. JACK,
JOHN HANSEN.

---

Copies of this patent may be obtained for five cents each, by addressing the "Commissioner of Patents, Washington, D. C."